Jan. 13, 1959

A. H. BURRISE 2,868,484

MOTOR MOUNTS AND CLIPS

Filed Jan. 18, 1954

INVENTOR
ANDREW H. BURRISE
BY
ATTORNEY

# United States Patent Office 2,868,484
Patented Jan. 13, 1959

2,868,484

MOTOR MOUNTS AND CLIPS

Andrew H. Burrise, Galesburg, Ill., assignor to Admiral Corporation, Chicago, Ill., a corporation of Delaware Application January 18, 1954, Serial No. 404,420

5 Claims. (Cl. 248—22)

This invention relates to improved means for resiliently mounting a member to be supported upon a supporting means and to improved means for maintaining the member to be supported in place. More particularly, it relates to improved means for resiliently supporting apparatus or machines, and particularly machines having moving or rotating parts, such as motors, compressors, or motor-compressor units, in or on a suitable supporting means.

In supporting apparatus or machines, and particularly machines having moving or rotating parts, it is usually desirable to provide resilient mountings for absorbing shock and dampening the transmission of sound. This is particularly true with respect to machines utilized in household appliances, such as refrigerators, in which the transmission of sound from rotating or movable parts is particularly annoying. In accordance with the present invention, improved means are provided for resiliently supporting a member on a suitable supporting member and for locking the member to be supported in place and while not limited thereto, the invention is particularly adapted for use in resiliently supporting machines having movable or rotatable parts, such as motors, compressors, or motor-compressor units, to minimize or substantially eliminate the transmission of sound. The present invention also provides means for resiliently mounting a machine having movable or rotating parts, such as a motor, compressor, or a motor-compressor unit at a plurality of points in a recess or chamber in a refrigerator including improved means for locking the machine in place which locking means is releasable so that the machine may be easily removed for inspection or repairs.

It is therefore an object of the present invention to provide improved means for resiliently mounting a member to be supported on a suitable supporting member.

Another object of the invention is to provide improved means for resiliently mounting a member to be supported in place on a suitable supporting means, and to improved means for locking the mounted member in place which locking means is releasable to enable the supported member to be easily removed from its supported position.

A further object of the invention is to provide improved supporting means for resiliently supporting a machine having movable or rotating parts at a plurality of points and for locking the machine in place which locking means are easily releasable to enable the machine to be readily removed from its supported position.

A still further object of the invention is to provide improved supporting means for resiliently supporting a machine having movable or rotating parts at a plurality of points and for locking the machine in place which locking means are easily releasable to enable the machine to be readily removed from its supported position.

A still further object of the invention is to provide improved means for resiliently mounting a machine having movable or rotating parts, such as a motor, compressor, or a motor-compressor unit in a chamber or recess in a refrigerator and to improved locking means for maintaining the machine in place which locking means are releasable so that the machine may be easily removed for inspection or repairs.

The invention will be better understood by reference to the accompanying drawings in which.

Figure 1:
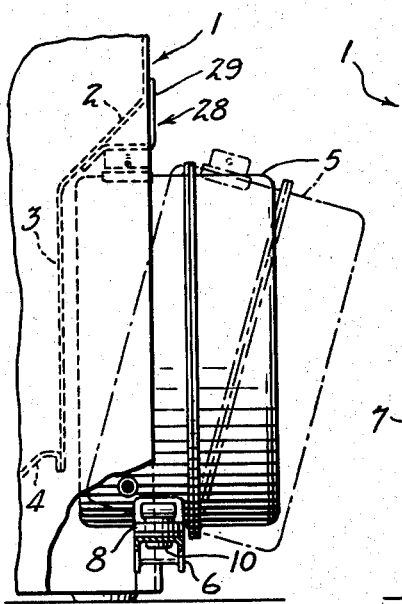
Fig. 1 is a side elevational view of a motor-compressor unit, showing means for resiliently supporting it in place in a recess in a refrigerator, the motor-compressor unit being shown in full lines in its assembled position and in dotted lines in its partly assembled position.

While the improved mounting means of the present invention is of general application and may be utilized for mounting and locking any desired object or apparatus to be supported on or in a suitable supporting means, as illustrated in the drawings, upper and lower mounting means are shown for supporting a motor-compressor unit in a recess formed in a refrigerator.

To conserve space and provide a greater storage area within the refrigerator, it is the practice at the present time to provide a recess in the lower rear portion of the refrigerator in which the motor-compressor unit is supported and in accordance with the present invention, means are provided to resiliently support the motor-compressor unit with at least a portion thereof extending into this recess.

As illustrated in the drawings, the refrigerator which is designated generally by the numeral 1 has a short downwardly inclined wall 2, the lower portion of which extends vertically as indicated by the numeral 3 and is then connected to a lower insulating supporting wall 4 to provide a recess into which at least a portion of the motor-compressor unit extends.

In accordance with the present invention, improved means are provided to support the motor-compressor unit in a position in which it extends at least partly within this recess. As illustrated, means associated with the lower portion of the refrigerator and the motor-compressor unit is provided for resiliently supporting the lower portion of the compressor unit in place and means associated with the upper portion of the motor-compressor unit and the refrigerator is provided for resiliently supporting the upper portion of the motor-compressor unit in place.

For supporting the lower portion of the motor-compressor unit, a metal strip or plate 6 is provided having its opposite ends secured by suitable means, such as welding, to inwardly extending flanges 7 on the side walls of the refrigerator. While the strip or plate 6 may be of any desired shape, as illustrated it consists of a channel-shaped member and means associated with the plate 6 and the motor-compressor unit are provided to resiliently support and lock the lower portion of the motor-compressor unit in position on the lower strip or plate 6.

As illustrated in the drawings, the motor-compressor unit is provided with a pair of outwardly extending legs 8 and 9, each of which is resiliently supported on the plate or strip 6 and since the mountings are similar, only one will be specifically described.

Figure 6:
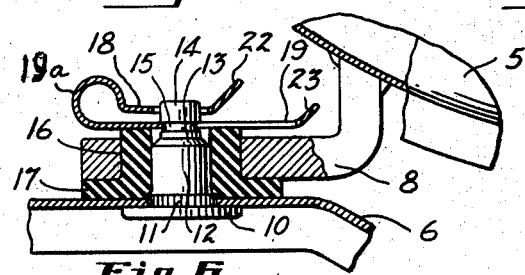
Fig. 6 is a detail cross sectional view of one of the lower mounting means for the motor-compressor unit, showing parts in elevation and the locking means in its operative position.
Figure 7:
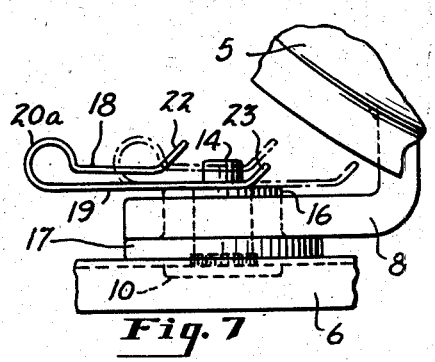
Fig. 7 is a side elevational view of one of the lower mounting means for a motor-compressor unit, showing the locking means in dotted lines in the locked position and in full lines in its released position.
Figure 8:
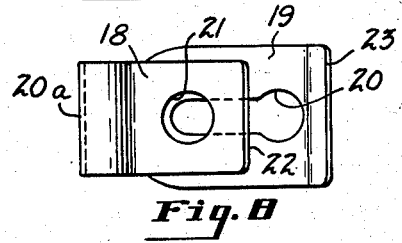
Fig. 8 is a plan view of the locking means shown in Fig. 7.

As illustrated more particularly in Figs. 6, 7 and 8, a stud is provided which is supported by strip 6 and extends upwardly therefrom. As shown the stud has a head 10 which engages the lower face of plate 6 and an annular milled portion 11 which extends through an aperture in the plate 6 and makes a tight frictional engagement therewith. Usually the milled portion will be sufficient to maintain the stud in place although if desired, the upper edge of the milled portion may be peened into engagement with the plate. While the stud may be of any desirable shape, as shown in the drawings, it is provided with a cylindrical portion 12 which is flared inwardly at a spaced distance from its upper end as indicated by the numeral 13 to provide a reduced cylindrical portion 14 provided with an annular groove 15.

In supporting the motor-compressor unit 5 in place, two studs are provided, each of which is surrounded by a grommet formed of a resilient material, such as rubber. The grommet is composed of a cylindrical portion 16 which surrounds the cylindrical portion 12 of the stud and an annular flange 17, the lower portion of which engages the upper surface of strip 6. Each of the legs of the motor-compressor unit, which in the present instance is the member to be supported, is provided with an aperture through which the cylindrical portion of grommet 16 extends. It will be noted that the cylindrical portion of the grommet extends a short distance above the leg of the motor-compressor unit and is substantially level with the lower portion of groove 15 and improved means are provided to lock the motor-compressor unit in place which locking means may be easily released so that the motor-compressor unit may be removed for inspection or repairs.

The improved locking means which is also of general application preferably consists of an integral strip of resilient metal which is bent intermediate its ends to provide upper and lower spaced leaves 18 and 19 and a looped connector 19a which is preferably arcuate in shape and extends above the lower leaf 19. As illustrated in the drawings, leaves 18 and 19 extend in the same general direction and the free end of leaf 18 is normally biased downwardly toward leaf 19. Leaf 19 is longer and wider than leaf 18 and is provided with a key-hole slot 20, the large portion of which extends beyond a vertical plane passing through the free end of the upper leaf 18 and the narrow portion of which extends beneath the upper leaf and is in alignment with a substantial portion but terminates a short distance from a plane passing through the outer edge of an aperture 21 in the upper leaf.

The locking means as thus provided may be readily applied to the stud and grommet to lock the member to be supported in place. As illustrated in Fig. 7, the large portion of the key-hole slot 20 is applied over the cylindrical portion 14 of the stud with its bottom portion resting upon the upper edge of the cylindrical portion 16 of the grommet. At this time the upper leaf is spaced from the cylindrical portion 14 of the stud and is inclined downwardly relative thereto. When the locking means is pushed forwardly from its position as shown in Fig. 7 to its position as shown in Fig. 6, the narrow portion of the key-hole slot engages the groove 15 formed in the stud and the free end portion of the upper leaf engages the cylindrical portion 14 of the stud. The free end of the upper leaf 18, however, is inclined upwardly as indicated by the numeral 22 so that when it engages the stud, it will be forced upwardly under tension and the upper leaf will ride freely over the upper edge of the stud. The free end of the lower leaf 19 is also inclined upwardly as indicated by the numeral 23 so that it will ride freely over the upper edge of the grommet. When the locking means is moved forwardly a sufficient distance to cause the outer edge of the narrow portion of the key-hole slot to engage groove 15, the aperture 21 of the upper plate is in alignment with the upper edge of the stud and due to the resiliency of the metal and to the tension that has been placed on the free end of the upper leaf 18 when it engages the upper portion of the stud, the upper leaf will snap over the upper end of the stud to hold the narrow portion of the key-hole slot in tight fitting engagement with the grooved portion of the stud which in turn holds the resilient grommet and the leg of the motor-compressor unit in place. Because of the resiliency of the metal and particularly that portion forming the connector, it will be apparent that the upper leaf of the locking means may be easily released from the upper portion of the stud. The locking means may then be pulled rearwardly to the position shown in Fig. 7 to move the large portion of the key-hole slot in alignment with the upper portion of the stud at which time the lower leaf may also be removed from the stud.

When the lower supporting member 6 is comparatively narrow as shown, an upper resilient mounting may be provided to supplement the two lower resilient mountings in maintaining the member to be supported in place. An upper mounting means is also particularly desirable when the member to be supported is comparatively large, such as a motor, compressor, or a motor-compressor unit 5 as illustrated in the drawings.

Figure 2:
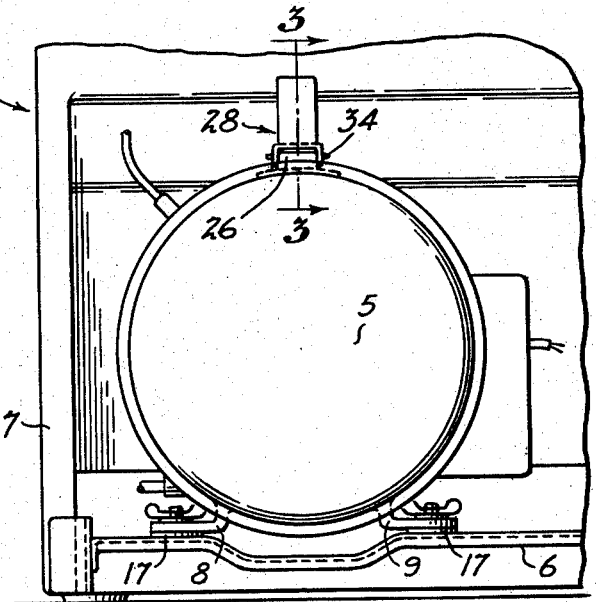
Fig. 2 is an end elevational view of a motor-compressor unit, showing a side elevational view of the lower mounting means and an end elevational view of the upper mounting means for supporting the motor-compressor unit in a recess in a refrigerator.
Figure 3:
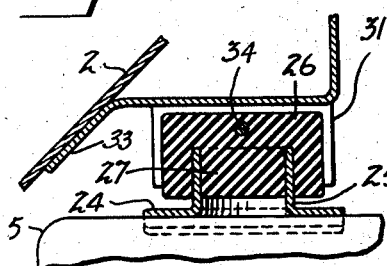
Fig. 3 is an enlarged cross sectional view taken on a plane passing through the line 3—3 of Fig. 2, looking in the direction of the arrows, with part of the mounting means and the upper portion of the motor-compressor unit being shown in elevation.
Figure 4:
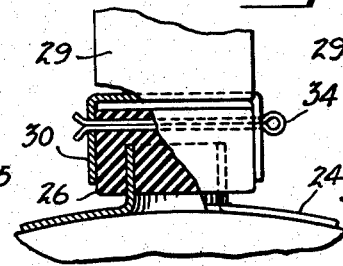
Fig. 4 is a front view of the upper supporting means, showing parts in elevation and parts in section.
Figure 5:
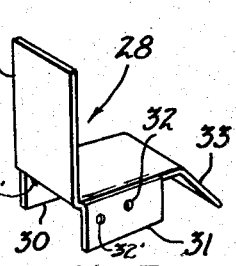
Fig. 5 is a perspective view of the bracket for supporting the upper portion of the motor-compressor unit in place.

To provide the upper resilient mounting, an arcuate-shaped plate 24 as shown in Figs. 1 to 4 and particularly in Figs. 3 and 4 of the drawing, is secured by suitable means, such as welding, to the upper portion of the casing of the motor-compressor unit in proximity to its inner face. Plate 24 is provided with an upwardly extending collar 25 and a rectangularly-shaped body 26 formed of a resilient material, such as rubber, has cylindrically-shaped recess therein to receive the collar 25, which recess also provides a cylindrically-shaped resilient plug 27 which fits snugly in collar 25, and means connected to the refrigerator at the upper portion of the recess is provided for receiving the resilient body 26 and for securing the upper portion of the motor-compressor unit in place. For this purpose, a bracket designated generally by the numeral 28 is provided which as shown in Fig. 5 may be formed of a single sheet of metal. The bracket 28 comprises an upwardly extending flange 29 which may be secured by suitable means, such as welding, to the rear side of the refrigerator, a central portion having downwardly extending spaced flanges 30 and 31 provided with aligned apertures 32, and a downwardly inclined portion 33 which engages inclined wall 2 of the recess in the refrigerator and is welded or otherwise secured thereto. From the drawing, it will be noted that the rectangularly-shaped body 26 is of such size that it fits snugly between the flanges 30 and 31 of the bracket.

In assembling the motor-compressor unit in place, it is first arranged in an inclined position as illustrated in Fig. 1 with each leg engaging the lower flange of a grommet and with the cylindrical portion of each grommet extending through an aperture in a leg, and as the upper portion of the motor-compressor unit is moved inwardly into the recess or chamber in the refrigerator, the lower surface of each leg is moved to a horizontal position in which it rests upon the flange 17 of the grommet with which it is associated and the upper resilient body 26 is moved between flanges 30 and 31 of the bracket 28 and may be held therein by any suitable means, such as a cotter pin 34 which extends through the aligned openings 32 in the bracket and an opening in the resilient body 26. The lower locking means are then applied to maintain the lower portion of the motor-compressor unit in place.

To remove the motor-compressor unit from the mountings, the lower locking means are removed in the manner previously described, the cotter pin 34 is withdrawn, at which time the upper portion of the motor-compressor unit may be inclined outwardly to the dotted line position shown in Fig. 1 and may then be removed from the lower mounting means.

It will be appreciated that the locking means for the lower studs are not essential to the mounting of Figs. 1 and 2 inasmuch as once the upper end is locked in position the upper horizontal part of the bracket 28 keeps the motor from rising off of the studs. Furthermore the cotter pin 34 does not have to go through the rubber but may be passed through the holes 32' in rear of the entrance to the channel formed by the sides 30—31. In this case it may be desirable to make the rubber block 26 longer so that the back end engages with the inclined part 33, the cotter pin in this case engaging the front of the block 26.

The locks are however most desirable when the upper mount is not used. In this case usually the compressor or motor is mounted in a horizontal position and four legs are provided instead of two.

Having thus described my invention I am aware that numerous and extensive dispositions may be made therefrom without departing from the spirit of the invention as defined by the appended claims:

I claim:

1. A mounting including a supporting member having a stud extending upwardly therefrom, the upper portion of which is provided with a groove, resilient means having a flange at its lower end for engaging the supporting member and a cylindrical portion surrounding and in slidable engagement with the upper portion of said stud, and which terminates at substantially the same horizontal plane as the lower portion of said groove, a member to be mounted having a portion provided with an aperture for receiving the cylindrical portion of the resilient means and the lower portion of which rests on said flange, and means for locking the member to be supported in place including upper and lower resilient leaves connected together at one end and the free end portions of which extend in the same general direction, said lower leaf being provided with a key-hole slot, the large portion of which receives the upper portion of said stud and the narrow portion of which is substantially the same width as the diameter of the grooved portion of said stud, and said upper leaf being provided with an aperture which is slightly larger than said stud and which is arranged in alignment with the end portion of the narrow slot in the lower leaf with a portion thereof extending outwardly beyond the end of the narrow slot, and said locking means being slidable inwardly on the cylindrical portion of the resilient means to a position in which the opposite edges of the narrow portion of the keyhole slot engage the grooved portion of said stud and the upper portion of the stud extends through the aperture in the upper leaf to thereby prevent outward sliding movement of the locking means 2. A mounting including a supporting member having a stud extending upwardly therefrom, the upper portion of which is provided with a groove, resilient means having a flange at its lower end for engaging the supporting member and a cylindrical portion surrounding and in slidable engagement with the upper portion of said stud and which terminates at substantially the same horizontal plane as the lower portion of said groove, a member to be mounted having a portion provided with an aperture for receiving the cylindrical portion of the resilient means and the lower portion of which rests on said flange, and means for locking the member to be supported in place including upper and lower resilient metal leaves integrally connected together at one end and the free end portions of which extend in the same general direction and each of which is provided at its free end with an upwardly inclined portion, said lower leaf being provided with a key-hole slot, the large portion of which receives the upper portion of said stud and the narrow portion of which is susbtantially the same width as the diameter of the grooved portion of said stud, and said upper leaf being biased downwardly toward the lower leaf and being porvided with an aperture which is slightly larger than said stud and which is arranged in alignment with the narrow portion of the key-hole slot in the lower leaf with a portion extending outwardly beyond a vertical plane extending through the inner edge of the narrow portion of the key-hole slot, and said locking means being slidable inwardly to cause the lower leaf to slide over the upper end of the resilient means and the free end of the upper leaf to slide over the free end of said stud to a position in which the narrow portion of the key-hole slot engages the grooved portion of said stud and the aperture in the upper leaf is in alignment with the upper end of said stud, and said upper leaf being under sufficient tension when the aperture therein is moved in alignment with said stud to cause it to snap over said stud.

3. Resilient locking means comprising upper and lower leaves integrally connected together to form one end of the locking means with the free ends of the leaves extending in the same general direction and the lower leaf being longer than the upper leaf and being provided with a key-hole slot, the large portion of which is arranged beyond the free end of the upper leaf, and the upper leaf being provided with an aperture, the greater portion of which is in vertical alignment with the end portion of the narrow slot in the lower leaf.

4. Resilient locking means comprising upper and lower resilient leaves integral with a connector having a loop portion extending above the leaves and the free ends of said leaves extending in the same general direction from said connector and the lower leaf being longer than the upper leaf and being provided with a key-hole slot, the large portion of which is arranged beyond the free end of the upper leaf and the narrow portion of which extends beneath the upper leaf and the free end portion of the upper leaf being normally biased downwardly toward the lower leaf and being provided with an aperture, the greater portion of which is in alignment with the end portion of the narrow slot and the remainder of which extends beyond the end portion of the narrow slot toward said connector.

5. Resilient locking means comprising upper and lower resilient leaves integral with a connector having a loop portion extending above the leaves, said leaves extending in the same general direction from the connector and the free end of each leaf being provided with an upwardly inclined portion, said lower leaf being longer than the upper leaf and being provided with a key-hole slot, the large portion of which slot is arranged beyond the free end of the upper leaf and the narrow portion of which extends beneath the upper leaf, and the free end portion of the upper leaf being normally biased downwardly toward the lower leaf and being provided with an aperture, the greater portion of which is in alignment with the end portion of the narrow slot in the lower leaf and the remainder of which extends beyond the end of the narrow slot toward said connector.

(References on following page)

References Cited in the file of this patent

UNITED STATES PATENTS

| | | |
|---|---|---|
| 1,038,664 | Schell | Sept. 17, 1912 |
| 1,874,935 | Drake | Aug. 30, 1932 |
| 1,947,921 | Patter et al. | Feb. 20, 1934 |
| 2,237,465 | Zimmermann | Apr. 8, 1941 |
| 2,455,891 | Flanagan | Dec. 3, 1948 |
| 2,534,105 | Churchill | Dec. 12, 1950 |
| 2,551,514 | Truelove et al. | May 1, 1951 |
| 2,638,753 | Doeg | May 19, 1953 |
| 2,711,871 | Eck | June 28, 1955 |

FOREIGN PATENTS

| | | |
|---|---|---|
| 134,523 | Sweden | Feb. 5, 1952 |